March 26, 1935.  A. G. LEAKE  1,995,313
METHOD OF STRENGTHENING EYEBARS
Filed March 6, 1933  4 Sheets-Sheet 1

INVENTOR
Arthur G. Leake
BY
Wooster & Davis
ATTORNEYS.

March 26, 1935. A. G. LEAKE 1,995,313
METHOD OF STRENGTHENING EYEBARS
Filed March 6, 1933 4 Sheets-Sheet 2
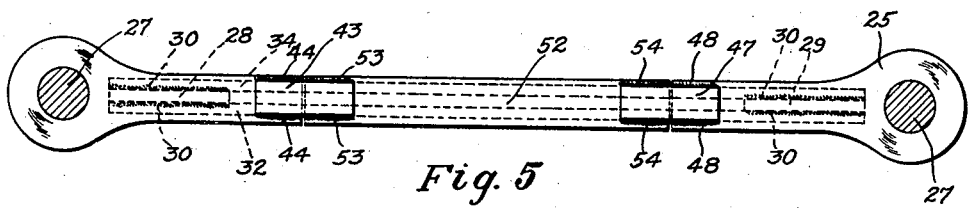
Fig. 5
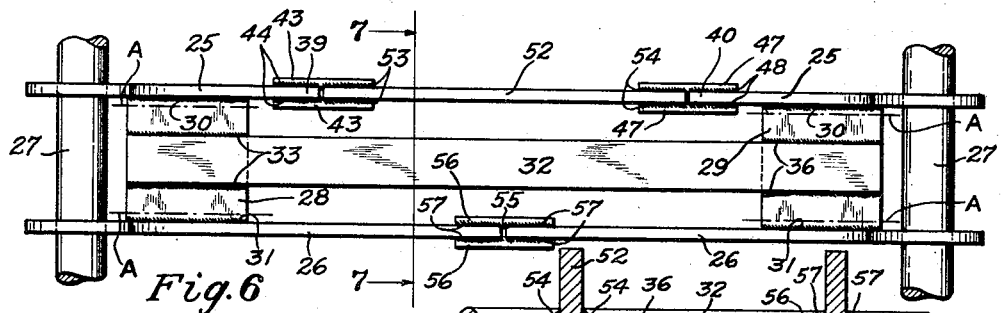
Fig. 6
Fig. 7
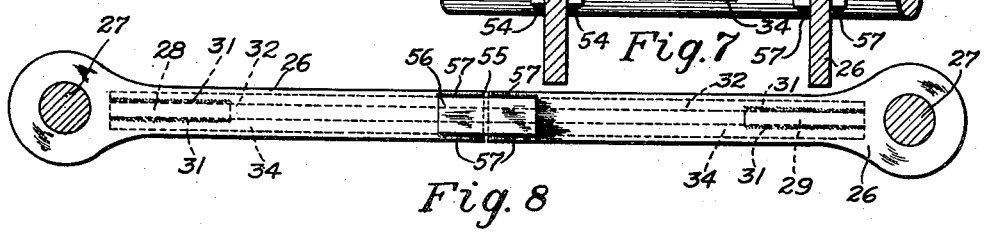
Fig. 8
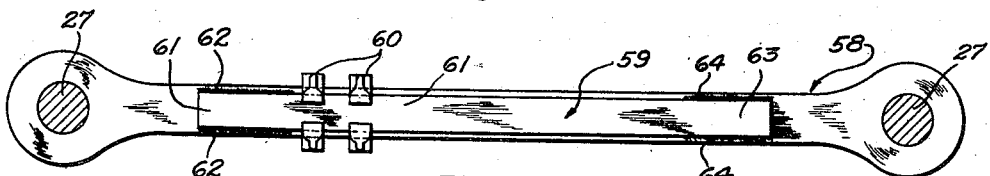
Fig. 9
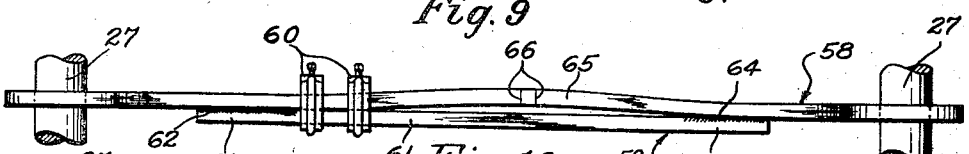
Fig. 10
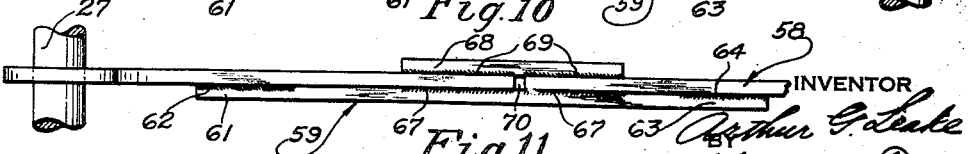
Fig. 11
INVENTOR
Arthur G. Leake
Wooster & Davis
ATTORNEYS March 26, 1935. A. G. LEAKE 1,995,313

METHOD OF STRENGTHENING EYEBARS

Filed March 6, 1933 4 Sheets-Sheet 4

INVENTOR
Arthur G. Leake,
BY
Worster & Davis
ATTORNEYS

Patented Mar. 26, 1935

1,995,313

UNITED STATES PATENT OFFICE 1,995,313

METHOD OF STRENGTHENING EYEBARS

Arthur G. Leake, Bridgeport, Conn.

Application March 6, 1933, Serial No. 659,789

15 Claims. (Cl. 29—151)

This invention relates to a method of strengthening and tensioning eyebars of bridges and like structures and has for an object to provide a method whereby corroded or weak and worn eyebars and eyebars which have lost their tension and are loose and inclined to rattle may be strengthened or reinforced and tensioned without removing them from a bridge or other structure and with a minimum of interference with the normal use of the structure incorporating the eyebars.

With the foregoing and other objects in view I have devised the improved method which is more fully disclosed in the following detailed description taken in connection with the accompanying drawings. However, it is to be understood that the invention is not limited to the details disclosed but includes all such variations and modifications as fall within the spirit of the invention and the scope of the appended claims.

In the drawings:

Fig. 5 is a side elevational view showing an eyebar treated in accordance with the present method;

Fig. 6 is a top plan view of the arrangement of Fig. 5;

Fig. 7 is an enlarged sectional view taken substantially along the line 7—7 of Fig. 6;

Fig. 8 is a view similar to Fig. 5 but looking toward the near or lower bar in Fig. 6;

Fig. 9 is a side elevational view illustrating the application of the method whereby but one eyebar is to be strengthened and tensioned;

Fig. 10 is a plan view of Fig. 9;

Fig. 11 is a plan view showing the eyebar of Figs. 9 and 10 at the completion of the strengthening and tensioning operation;

Figure 1:
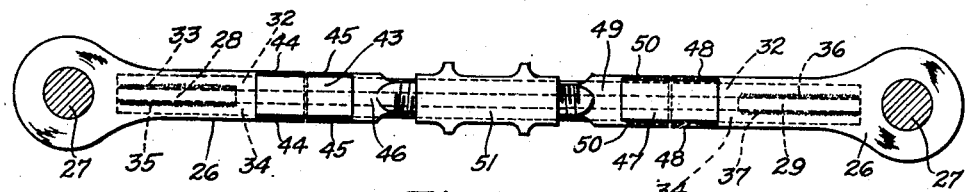
Fig. 1 is a side elevational view illustrating the strengthening and tensioning of eyebars according to the method of the present invention.
Figure 2:
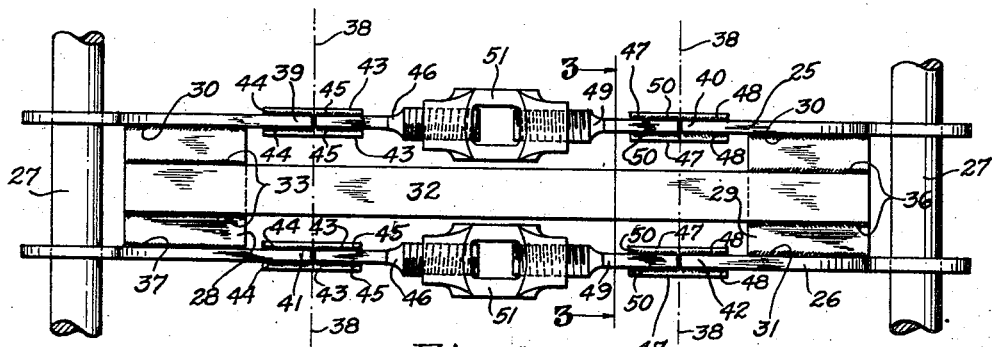
Fig. 2 is a top plan view thereof.
Figure 3:
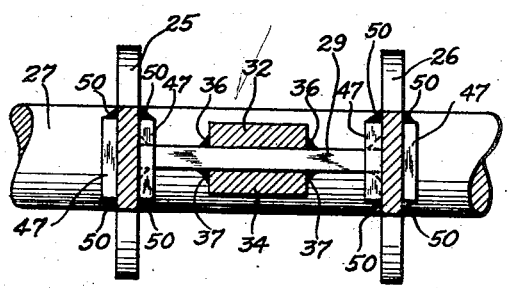
Fig. 3 is an enlarged sectional view taken substantially along the line 3—3 of Fig. 2.

Referring in detail to the drawings and at first particularly to Figs. 1, 2 and 3 thereof, at 25 and 26 are shown a pair of spaced eyebars through the eyes or end portions of which pass pins 27. The eyebars as shown are to be considered as in place in a structure as for example in a counter eyebar bridge, and it will further be considered that the eyebars have become loose and that their central or intermediate portions are corroded and weakened. These eyebars may or may not include turn buckles, and if they do include turn buckles these turn buckles may have corroded so they cannot be tightened in the usual manner by screwing them up, or they may have become so corroded as to be too weak. According to the method of the present invention either or both of the eyebars may be strengthened or taken up or tensioned whereby to have the eyebar or eyebars assume their full load.

In practicing the invention as shown in Figs. 1, 2 and 3 wherein both eyebars are to be treated, webs or anchor plates 28 and 29 are disposed between the eyebars 25 and 26 and the opposite edge portions of the plates are welded to the respective eyebars as at 30 and 31. That is, one edge of each plate is welded to the eyebar 25 at 30 while the opposite edge of each plate is welded to the eyebar 26 at 31. It will be noted that the plates or webs 28 and 29 are arranged adjacent the ends of the eyebars and when the webs are in place one end of a strengthening bar 32 is welded to one of the webs, as for example, the web 28, of the weld being shown at 33.

Next, if desired, a second strengthening bar 34 may be welded at one end to the opposite side of the web 28 as at 35. The bars 32 and 34 are now heated to elongate them and then while they are heated and elongated their opposite end portions are welded to the web 29 as at 36 and 37 respectively. The bars are now permitted to cool and when they have returned to normal temperature they will be stressed and will have applied a pressure or force to the end portions of the eyebars in a direction tending to draw the pins 27 toward one another. In other words, the eyebars are prestressed, or that is, given the stress they are normally intended to carry. The amount of this stress is determined by the amount they are expanded by the heating before the second end is welded to the second anchor plate as above described. This can be very accurately determined.

Thus, the end portions of the eyebars beyond the webs 28 and 29 are tensioned and this pressure or force exerted due to contraction of the bars 32 and 34, while cooling, will cause the intermediate portions of the eyebars to buckle or bulge, it being understood that the end portions of the bars 32 and 34 are rigidly secured to the eyebars through the plates or webs 28 and 29. Further, it will be understood that the bars 32 and 34 are heated and expanded to the point where when they cool or return to normal temperature after having their end portions welded to the webs, they will be prestressed to immediately assume the load originally intended to be carried by the eyebars.

A part of the intermediate or buckled portion, that is the deteriorated portion, of each eyebar is now removed, the eyebars being cut or severed as along the dot and dash lines 38 of Fig. 2, thus providing the eyebar 25 with opposed severed ends 39 and 40 and eyebar 26 with opposed severed ends 41 and 42. Splice plates 43 are now welded to the opposite sides of the end portion 39 of eyebar 25, the welds being shown at 44 and these splice plates extend beyond the said severed end and if turn buckles are required receive and have welded to them at 45 one end of a threaded member 46. In the same manner splice plates 47 are welded to the opposed end portion 40 of eyebar 25, the welds being shown at 48, and these splice plates 47 also extend and receive and are welded to an end of a second threaded member 49 as at 50.

The above described steps are repeated on the severed end portions 41 and 42 of the eyebar 26. The threaded members 46 and 49 are obviously arranged between the severed ends of the eyebars and the members 46 are threaded as with left hand threads while the members 49 are provided with right hand threads. Therefore the threaded members are arranged in pairs and each pair is connected by a turnbuckle 51. Since the bars 32 and 34 are stressed as above described it will be apparent that the turnbuckles 51 may be turned up until they are tight and the eyebars will then reassume the load if bars 32 and 34 are removed. The members 46 and 49 may be heated to expand them and then the turn buckle turned up tight while they are so expanded. This is a convenient and effective way of securing the proper stress in the bars when they cool without the necessity of securing it by operation of the turn buckles. After the turn buckles are tightened the bars 32 and 34 and the webs or plates 28 and 29 may be removed if desired, this simply requiring that the plates be cut away from the eyebars with a torch or the like, or the bars 32 and 34 may be left in place if desired so as to add their strength to the structure.

It is noted that the eyebars are not cut until after the webs are secured to them and the bars 32 and 34 have been secured to the webs. Therefore, during the time the webs are being secured to the eyebars the latter will not be free to swing about the pins 27 but will be held relatively stationary so that the work may be carried out in an expeditious manner. Further, it will be noted that the end portions of the eyebars are effectively connected by the webs and the bars 32 and 34 at the time at which the eyebars have their intermediate portions removed. Therefore, the remaining end portions of the eyebars will be held in their proper relative positions so that the severed ends of the respective bars may be connected by the take-up means comprising the threaded members 46 and 49 and turn buckle 51.

Figure 4:
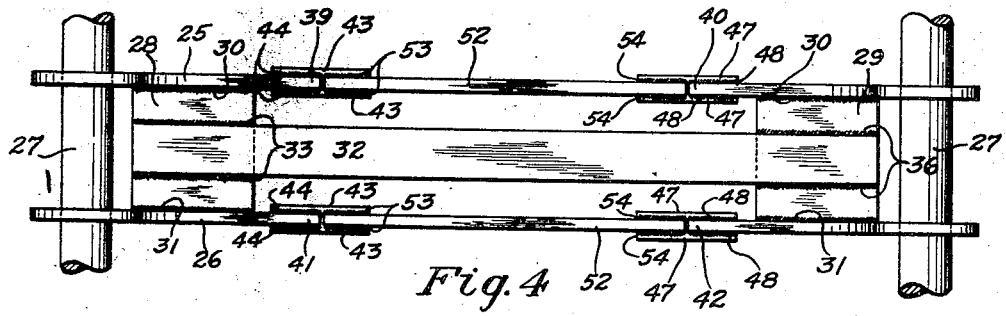
Fig. 4 is a plan view illustrating a slightly different method.

Fig. 4 represents by a slight variation the method disclosed in Figs. 1, 2 and 3. All but the final steps described in connection with Figs. 1, 2 and 3 are carried out in the variation disclosed in Fig. 4 and where the steps are the same the same reference characters have been used. That is, in Fig. 4 the webs or plates 28 and 29 are welded to the eyebars 25 and 26 and then one end of each bar 32 and 34 is welded to a plate and the bars are elongated by heating and their other ends are welded to the other plate. When the bars 32 and 34 contract on returning to normal temperature the end portions of the eyebars are tensioned and their intermediate portions are buckled and cut away to provide the severed ends 39 and 40 of eyebar 25 and 41 and 42 of eyebar 26. Splice plates 43 are then welded to the end portions 39 and 41 and splice plates 47 are welded to the end portions 40 and 42 as has already been described.

After the splice plates are in position connecting means or bars 52 are secured in position. One end of a bar 52 is received between the splice plates on the severed end 39 of eyebar 25 and an end of the other bar 52 is received between the splice plates on the severed end 41 of eyebar 26. The end portions of the respective bars are welded to the splice plates as at 53. Next, the bars 52 may be heated to elongate them the desired amount to give the required stress when they cool and while they are thus heated and elongated their opposite ends or end portions are welded to the splice plates 47 as at 54.

As bars 52 have been heated and expanded to a predetermined extent before they are welded at their second ends, when they return to normal temperature after being welded in place as above described they will be prestressed and will immediately take up the load. In this connection it will be noted that the bars 52 replace the removed central portions or intermediate portions of the eyebars and that said bars 52 are securely anchored in place and serve to anchor or tie together the severed end portions of the respective eyebars. When the prestressed bars 52 have returned to their normal temperatures and assumed the load the plates 28 and 29 and the bars connecting them may be removed or left in place as above explained. Thus the method and structure of Fig. 4 is the same as that of Figs. 1 and 2 except instead of using a turn buckle between the severed end portions of the eyebars a simple bar 52 is used and it is given the proper stress by expanding it before welding the second end. In Figs. 1 and 2 the proper stress is secured by the turn buckle.

Figs. 5 through 8 illustrate the manner in which the invention may be employed in repairing or strengthening and tensioning a pair of eyebars the intermediate portion of one of which has been weakened by corrosion while the intermediate portion of the other remains in good condition. In these figures the intermediate portion of the eyebar 25 has been cut away and replaced by the prestressed bar 52 in the manner fully set forth when considering Fig. 4. However, it has been assumed that the eyebar 26 needed only tensioning and that its central portion or intermediate portion had not been materially weakened or eaten away. After the bars 32 and 34 have been secured in place and have cooled or returned to normal temperature a large part of the intermediate portion of eyebar 25 was cut away while a relatively small part of the intermediate portion of eyebar 25 has been cut away the cut being indicated at 55 and representing the removal of but that quantity of material necessary to permit the eyebar 26 to lie flat and not buckle.

Either before or after or while the prestressed connecting means 52 is being incorporated in the eyebar 25 splice plates 56 are welded to the severed ends of the eyebar 26 as at 57 whereby said ends are securely and rigidly connected or tied together. The sections 26 may be expanded by heat before welding to the splice plates 55 and 56 so as to prestress the eyebar or put it under the proper tension when it cools. Of course, it will be understood that the eyebar 25 might be repaired in this same manner. That is, it might have but a short length of material removed from its buckled intermediate portion and that its severed ends might then be connected by splice plates disposed against its opposite sides and welded to it, the splice plates spanning its severed ends. As a finishing operation the temporary structure may be removed by cutting the webs 28 and 29 along the broken lines A, or the members 28, 29, 32 and 34, may be left in place to add additional strength to the structure.

Figs. 9, 10 and 11 disclose another variation of the method of the present invention. According to this modification an eyebar designated 58 is to be tensioned or repaired. In carrying out the method a strengthening bar 59 may be clamped against the intermediate portion of the eyebar 58 as by clamps 60 and then one end portion 61 of said bar is welded to the eyebar as at 62. Next, bar 59 is heated to cause it to expand and elongate to a predetermined extent depending on the prestressing or tension desired in the bar and while it is heated and elongated its end portion 63 is welded to the eyebar at 64. Bar 59 is now permitted to cool or return to its normal temperature and in doing so it contracts and causes the intermediate portion 65 of the eyebar to bulge or buckle as at 65, (see Fig. 10) it being understood that this intermediate portion of the eyebar has been weakened as by being stretched or corroded, or this intermediate portion may be in good condition but the bar has become loose as by wear of pins 27 or the side of the openings through which these pins extend.

A part of the bulged or intermediate portion 65 of the eyebar may now be removed as by cutting along the lines 66 of Fig. 10 and when this material has been removed the severed end portions of the eye bar will return toward normal position and will lie flat against the bar 59. The severed end portions may then be heated to expand them the desired amount for prestressing as above described and then welded to bar 59 the welds being shown at 67 and after this has been accomplished a splice plate 68 is disposed across the severed ends of the eyebar and welded to them the welds being shown at 69. If desired, the short space 70 between the severed ends of the eyebar may be filled with welding material. The clamps 60 may now be removed and the eyebar will be properly tensioned and strengthened so as to carry its full load and not be loose or free to rattle.

Figure 12:
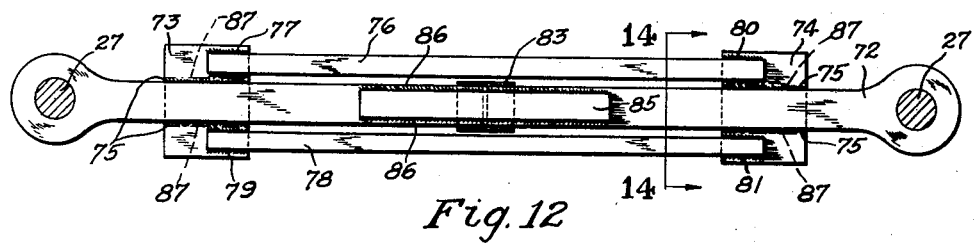
Fig. 12 is an elevational view illustrating the application of the invention when treating a pair of closely adjacent eyebars.
Figure 13:
Fig. 13 is a plan view of Fig. 12.
Figure 14:
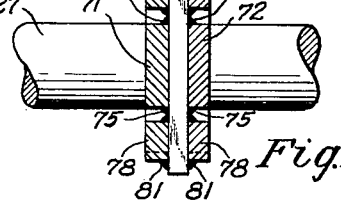
Fig. 14 is an enlarged sectional view taken substantially along the line 14—14 of Fig. 12.

Figs. 12, 13 and 14 show yet another modification of the invention whereby a pair of eyebars positioned relatively close to one another may be repaired or returned to their original tension. The eyebars are designated 71 and 72 and are mounted by the pins 27 and may form part of a bridge structure or the like. In carrying out the method anchor plates 73 and 74 each of a width or thickness to fit snugly between the eyebars are disposed between the eyebars in spaced relation to one another, one plate being disposed preferably adjacent one pin 27 while the other plate is disposed adjacent the other pin 27. These plates or webs 73 and 74 are now each secured to each eyebar as by welding, the welds being shown at 75.

The anchor plates 73 and 74 each extend both above and below the eyebars and next, a pair of upper bars 76 each has one of its end portions welded to one of the plates as the plate 73 as at 77 and a pair of lower bars 78 each has one of its end portions welded to said plate 73 as at 79. These bars 76 and 78 are then heated to expand them and when they have been expanded or elongated to a predetermined extent to give the desired initial stress their opposite end portions are welded to the plate 74 as at 80 and 81 respectively, it being understood that these latter welds are made while the bars are elongated.

Bars 76 and 78 are now permitted to cool or return to their normal temperatures and as they cool they will, of course, contract thus becoming tensioned and tensioning the portions of the eyebars beyond the webs 73 and 74. The intermediate or central portions of the eyebars will be caused to buckle by this contraction of the bars 76 and 78 and a suitable amount of material is then removed from the buckled portions of the eyebars whereby said eyebars may return to their normal flat or straight condition but with their severed ends in close relation as indicated at 82 in Fig. 13. A filler block or plate 83 is then inserted between the eyebars in a position spanning their severed ends and the severed end portions of the eyebar are welded to this filler as indicated at 84. If this does not give the eyebars the desired tension the free end portions between the plates 73 and 74 may be expanded by heating before they are welded to the plate 83 and welded to this plate while so expanded.

Next, splice plates 85 are arranged against the outer surfaces of the eyebars in positions spanning the severed ends thereof and these splice plates are welded in place as shown at 86. In this way, the eyebars 71 and 72 are returned to their original stressed condition and they are ready to assume the load and are so tensioned as not to rattle. If desired, the temporary parts may be removed as by cutting the webs or plates 73 and 74 along the lines 87, or they may be left in place to give added strength to the structure.

Figure 15:
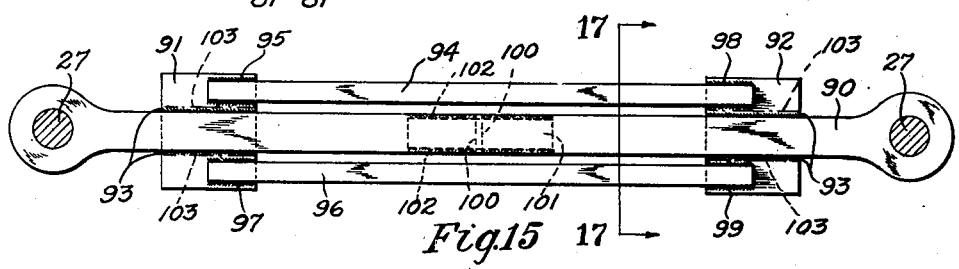
Fig. 15 is an elevational view illustrating a procedure when but one eyebar of a series is to be treated.
Figure 16:
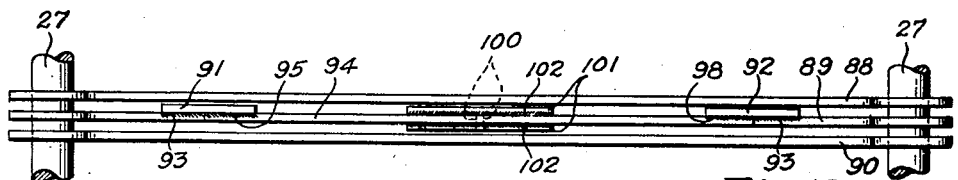
Fig. 16 is a plan view of Fig. 15.
Figure 17:
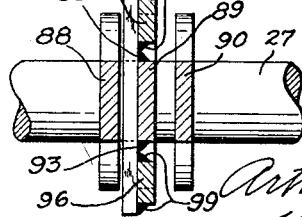
Fig. 17 is an enlarged sectional view taken substantially along the line 17—17 of Fig. 15.

Figs. 15, 16 and 17 disclose the method as utilized in the repairing or tensioning of but one eyebar of a group arranged relatively close together. In these figures three eyebars designated 88, 89 and 90 are shown as arranged in relatively close relationship and mounted as by the pins 27. It is the eyebar 89 which is to be repaired and anchor plates or webs 91 and 92 are welded to this eyebar as at 93, the plates being arranged in spaced relation, one plate being located adjacent each end portion of the eyebar. These plates 91 and 92 extend both above and below the eyebar and one end of a bar 94 is welded to the upper portion of plate 91 as at 95 while an end portion of a bar 96 is welded to the lower extending portion of the plate as shown at 97.

Next, the bars 94 and 96 are heated to expand them and while they are elongated to the desired predetermined extent their opposite end portions are welded to the plate 92 as at 98 and 99 respectively. Being now permitted to cool or return to their normal temperatures bars 94 and 96 contract tensioning the end portions of the eyebar 89 beyond the plates 91 and 92 and this contraction of the temporary bars causes a buckling or bulging of the intermediate portion of eyebar 89. When bars 94 and 96 reach normal temperature the buckled or bulged intermediate portion of the eyebar is cut or severed and some of the material removed, the lines of the cut being indicated at 100. With this accomplished the eyebar tends to return to its normal flat condition and splice plates 101 may then be applied to its opposite sides in position spanning the severed ends 100 and these splice plates are welded in place to the eyebar as indicated at 102. Before welding the end portions of bar 94 to the splice plates the portions of this bar between the plates 91 and 92 may be expanded by heat and then welded to the splice plates 101 while so expanded so as to give the bar the proper tension when it cools, if it is desired that it be greater than the tension given the end portions by bars 94 and 96. If desired, the temporary structure may be left in place or it may be removed as by cutting the webs 91 and 92 along the broken lines 103.

Figure 18:
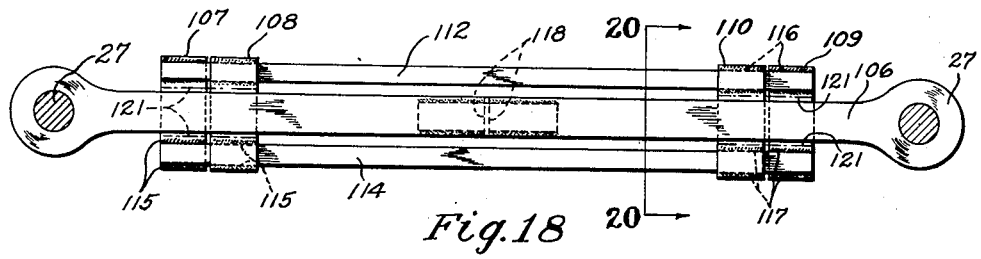
Fig. 18 is an elevational view showing a slight variation of the method illustrated in Fig. 15.
Figure 19:
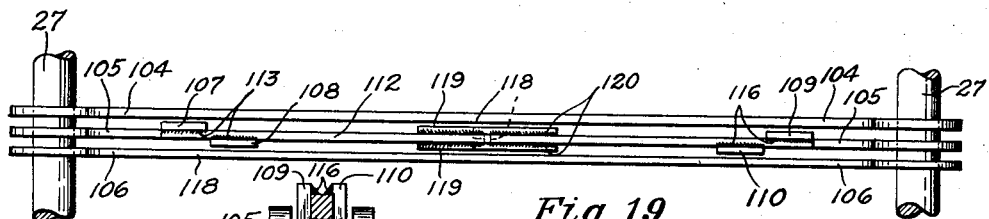
Fig. 19 is a plan view of Fig. 18.
Figure 20:
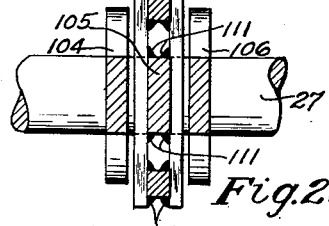
Fig. 20 is an enlarged sectional view taken substantially along the line 20—20 of Fig. 18.

Figs. 18, 19 and 20 illustrate a slight variation in the method shown in Figs. 15, 16 and 17. In Figs. 18, 19 and 20 three eyebars 104, 105 and 106 are shown as mounted on the pins 27 and these eyebars are relatively close together and the intermediate eyebar 105 is the one to be repaired or tensioned. In carrying out the method a plate or web 107 is welded to one side of the eyebar 105 adjacent one of its ends and slightly inwardly of the web 107 a second web 108 is welded to the opposite side of said eyebar. Toward the opposite end portion of the eyebar a web 109 is welded to it being disposed against one of its sides and also welded to the eyebar against its side opposite the web 109 and slightly inwardly of the latter is a web 110. The welds for the webs 109 and 110 are designated 111 and are best shown in Fig. 20.

All four of the webs 107 through 110 extend both above and below the eyebar 105 and it will be noted that these webs are arranged in pairs toward the end portions of the eyebar, the webs 107 and 108 constituting one pair and the webs 109 and 110 constituting the other pair. A bar 112 is now disposed over the eyebar 105 with one of its ends arranged between the webs 107 and 108 and this end of the bar 112 is welded to said webs as at 113. Similarly a lower bar 114 is arranged below the eyebar 106 with one of its ends between the webs 107 and 108 and said end is welded to said webs as at 115.

Next, the bars 112 and 114 are heated to expand them and when they are expanded or elongated to the desired predetermined extent for the desired stress their end portions are welded to the webs 109 and 110 as at 116 and 117. Bars 112 and 114 are now permitted to return to normal temperature and in so doing they contract and apply a pressure to the end portions of the eyebar 105 and buckle or bulge its intermediate portion and tension the end portions of said eyebar beyond the plates 107 and 109. The buckled intermediate portion of the eyebar is cut as along the line 118 and a portion of the material removed so that the severed end portions of the eyebar may straighten and lie in the same plane. Splice plates 119 are disposed against the severed end portions of the eyebar in a manner to span said severed ends and are then welded to the eyebar as at 120. If desired, the portions of the eyebar 106 between the anchor plates 108 and 110 may be heated and expanded before welding to the plates 109 and 110, and welded to these plates while so expanded so that they are prestressed. When this work has been completed the temporary structure comprising the webs and the bars 112 and 114 may be removed as by cutting the webs along the dot and dash lines 121 or they may be left in place as desired.

Figure 21:
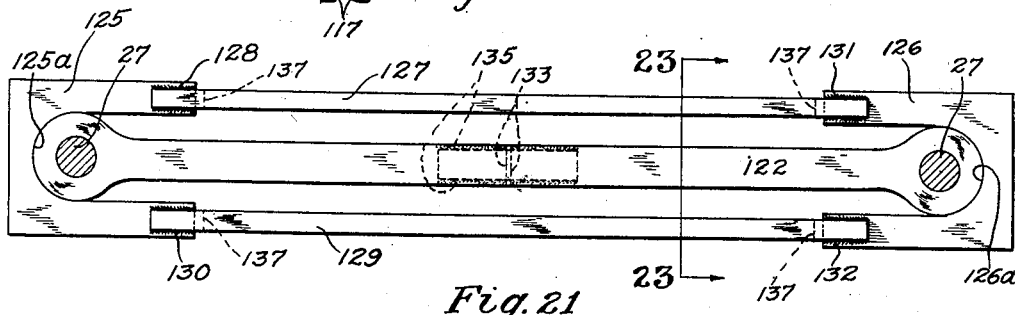
Fig. 21 is a side elevational view illustrating a slightly different arrangement which may be employed when but one of a series of closely adjacent eyebars is to be treated.
Figure 22:
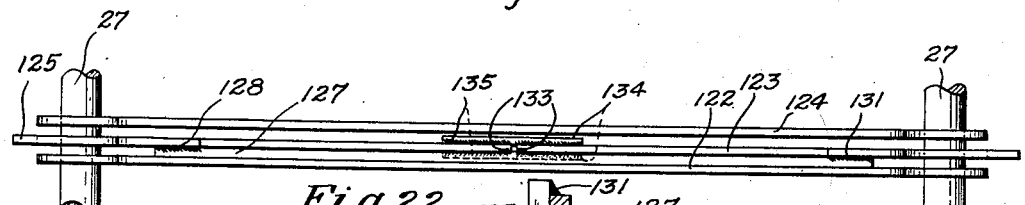
Fig. 22 is a top plan view of Fig. 21.
Figure 23:
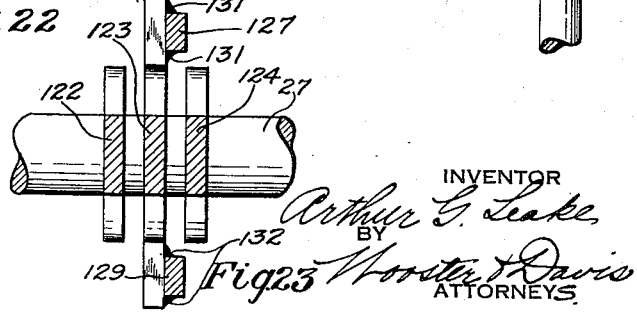
Fig. 23 is an enlarged transverse sectional view taken substantially along the line 23—23 of Fig. 21.

A somewhat different procedure is outlined in Figs. 21, 22 and 23 wherein of three relatively closely related eyebars 122, 123 and 124 the intermediate eyebar 123 is to be repaired. To accomplish this yokes 125 and 126 are arranged over the ends of the eyebar 123 and held in place by any suitable means. Each yoke is recessed from one end to provide a curved seat or abutment 125a or 126a to fit the curved head or end of the eyebar and therefore each yoke includes an upper and a lower arm and a bar 127 has one of its ends welded to the upper arm of yoke 125 as at 128 while a bar 129 has one of its end portions welded to the lower arm of said yoke as at 130. Next, the bars 127 and 129 are heated to elongate them an amount depending on the stress desired, and while they are so heated and elongated to the desired predetermined extent their opposite end portions are welded to the upper and lower arms of the yoke 126 as at 131 and 132 respectively.

Bars 127 and 129 are permitted to cool and contract and as they contract they will be stressed and draw the yokes 125 and 126 toward one another causing the intermediate portion of the eyebar 123 to buckle or bulge. This intermediate or bulged portion is then cut as along the lines 133, a portion of the material being removed, and the eyebar then flattens with its severed ends 123 in substantial alignment. Splice plates 134 are now arranged against the opposite sides of the eyebar in position spanning its severed ends and these splice plates are welded in place as suggested at 135. The portions of bar 123 may be heated before welding to the splice plates and then welded to the splice plates while so expanded. When this has been accomplished the yokes and the bars 127 and 129 may, if desired, be removed as by cutting the bars along the broken lines 137.

From the foregoing description taken in connection with the accompanying drawings it will be apparent that I have provided a method which may be carried out in a variety of ways and by means of which eyebars may be strengthened and tensioned while remaining in place in a structure. The structure may therefore be tightened and strengthened while in use and without interrupting traffic. The method provides for the applying of a force or pressure to the end portions of the eyebars in a manner to cause their intermediate portions to buckle and these intermediate portions are then cut or severed, a portion of the material being removed, whereby the eyebars may return to a flat condition after which their severed ends are tied together either with or without heating and expanding the severed members before the severed ends are tied together.

The severed ends may be connected or tied together in a variety of ways and if the intermediate portions of the eyebars have been weakened a substantial part of said portions may be removed and replaced by suitable connecting means as for example the turnbuckle structure 51 or the replacement bars 52 or the like.

Having thus set forth the nature of my invention, what I claim is:

1. The method of strengthening an eyebar while in place in a structure, the same comprising securing an end of a bar to said eyebar, heating said bar to elongate it, securing the other end of said bar to the eyebar while said bar is heated and elongated, permitting said bar to return to normal temperature at which temperature the bar and the portions of the eyebar beyond the ends of the bar will be tensioned while the portion of the eyebar between said ends will be buckled, severing the buckled portion of the eyebar to permit it to straighten, and then connecting the severed ends of said portion.

2. The method of strengthening an eyebar while in place in a structure, the same comprising welding an end of a bar to said eyebar, heating said bar to elongate it, welding the other end of said bar to the eyebar while said bar is heated and elongated, permitting said bar to return to normal temperature at which temperature the bar and the portions of the eyebar beyond the ends of the bar will be tensioned while the portion of the eyebar between said ends will be buckled, severing the buckled portion of the eyebar to permit it to straighten, and then connecting the severed ends of said portion.

3. The method of strengthening an eyebar while in place in a structure, the same comprising securing an end of a bar to said eyebar, heating said bar to elongate it, securing the other end of said bar to the eyebar while said bar is heated and elongated, permitting said bar to return to normal temperature at which temperature the bar and the portions of the eyebar beyond the ends of the bar will be tensioned while the portion of the eyebar between said ends will be buckled, severing and removing a portion of the buckled portions of the eyebar to permit it to straighten, and then securing a connecting means to the severed ends of said portion.

4. The method of strengthening an eyebar while in place in a structure, the same comprising welding and end of a bar to said eyebar, heating said bar to elongate it, welding the other end of said bar to the eyebar while said bar is heated and elongated, permitting said bar to return to normal temperature at which temperature the bar and the portions of the eyebar beyond the ends of the bar will be tensioned while the portion of the eyebar between said ends will be buckled, severing the buckled portion of the eyebar to permit it to straighten, and then welding a connecting means to the severed ends of said portion.

5. The method of strengthening an eyebar while supported in a structure by pins passing through its end portions, the same comprising securing a web to said bar adjacent each of its ends, securing an end of a bar to one of said webs, heating said bar to elongate it, securing the other end of the bar to the other of said webs while the bar is elongated, permitting the bar to cool whereby it and the end portions of the eyebar will be tensioned and the intermediate portion of the eyebar will be buckled, removing a part of the intermediate portion of the eyebar to permit it to straighten, and securing a connecting means to the ends of the eyebar formed by removal of said part of the intermediate portion of the eyebar.

6. The method of strengthening an eyebar while supported in a structure by pins passing through its end portions, the same comprising securing a web to said bar adjacent each of its ends, securing an end of a bar to one of said webs, heating said bar to elongate it, securing the other end of the bar to the other of said webs while the bar is elongated, permitting the bar to cool whereby it and the end portions of the eyebar will be tensioned and the intermediate portion of the eyebar will be buckled, severing the intermediate portion of the eyebar to permit it to lie flat, and then connecting said severed ends while the eyebar lies flat.

7. The method of strengthening an eyebar whle supported in a structure by pins passing through its end portions, the same comprising securing a web to said bar adjacent each of its ends, securing an end of a bar to one of said webs, heating said bar to elongate it, securing the other end of the bar to the other of said webs while the bar is elongated permitting the bar to cool whereby it and the end portions of the eyebar will be tensioned and the intermediate portion of the eyebar will be buckled, removing a part of the intermediate portion of the eyebar to permit it to straighten, and securing a turnbuckle to the ends of the eyebar formed by removal of said part of the intermediate portion of the eyebar.

8. The method of strengthening an eyebar while supported in a structure by pins passing through its end portions, the same comprising securing a web to said bar adjacent each of its ends, securing an end of a bar to one of said webs, heating said bar to elongate it, securing the other end of the bar to the other of said webs while the bar is elongated, permitting the bar to cool whereby it and the end portions of the eyebar will be tensioned and the intermediate portion of the eyebar will be buckled, removing a part of the intermediate portion of the eyebar to permit it to straighten, securing one end of a connecting bar to an end of the eyebar formed by removal of said part of the intermediate portion of the eyebar, heating said connecting bar to elongate it, and then while it is elongated securing its other end to the other end of the eyebar formed by removal of its intermediate portion.

9. The method of strengthening a pair of eyebars while in place in a structure, the same comprising securing a web to both of said eyebars adjacent their ends, securing a second web to both of said eyebars adjacent their other ends, securing one end of a bar to one of said webs, heating said bar to elongate it, securing the other end of said bar to the other of said webs while the bar is elongated, severing the portions of the eyebars between said webs to permit them to straighten, and then connecting the severed portions of the eyebars.

10. The method of strengthening a pair of eyebars while in place in a structure, the same comprising securing a web to both of said eyebars adjacent their ends, securing a second web to both of said eyebars adjacent their other ends, securing one end of a bar to one of said webs, heating said bar to elongate it, securing the other end of said bar to the other of said webs while the bar is elongated, removing a part of the portions of the eyebars between said webs to permit them to straighten, and then securing connecting means to the severed ends of the respective eyebars whereby to tie them together.

11. The method of strengthening a pair of eyebars while in place in a structure, the same comprising securing a web to both of said eyebars adjacent their ends, securing a second web to both of said eyebars adjacent their other ends, securing one end of a bar to one of said webs, heating said bar to elongate it, securing the other end of said bar to the other of said webs while the bar is elongated, removing a part of the portions of the eyebars between said webs, securing one end of a connecting means to a severed end of each of said eyebars, heating said connecting means to elongate the same, and then while said connecting means are elongated securing their other ends to the other severed ends of the respective eyebars.

12. The method of strengthening a pair of eyebars while in place in a structure, the same comprising securing a web to both of said eyebars adjacent their ends, securing a second web to both of said eyebars adjacent their other ends, securing one end of a bar to one of said webs, heating said bar to elongate it, securing the other end of said bar to the other of said webs while the bar is elongated, removing a part of the portions of the eyebars between said webs, and then securing turnbuckles in positions connecting the severed ends of the respective eyebars.

13. The method of strengthening an eyebar comprising applying pressure to the end portions of the eyebar in a manner to buckle its intermediate portion, severing and removing a part of the intermediate portion of the eyebar to permit it to straighten while said pressure is maintained, securing one end of a bar to a severed end of said eyebar, heating said bar to elongate it, and then while said bar is elongated securing its other end to the other severed end of the eyebar.

14. The method of strengthening an eyebar while in place in a structure, the same comprising welding an end of a bar to said eyebar, heating said bar to elongate it, welding the other end of the bar to the eyebar while said bar is elongated, permitting said bar to cool and draw the eyebar in a manner to buckle the intermediate portion of the latter, severing the intermediate portion of the eyebar to permit it to lie flat against said bar, and then welding the severed end portions of the eyebar to the intermediate portion of said bar.

15. The method of strengthening an eyebar while in place in a structure, the same comprising welding an end of a bar to said eyebar, heating said bar to elongate it, welding the other end of the bar to the eyebar while said bar is elongated, permitting said bar to cool and draw the eyebar in a manner to buckle the intermediate portion of the latter, severing the intermediate portion of the eyebar to permit it to lie flat against said bar, welding the severed end portions of the eyebar to the intermediate portion of said bar, and then welding a splice plate over the severed ends of the eyebar.

ARTHUR G. LEAKE.